(12) United States Patent
Kuhl

(10) Patent No.: US 6,883,528 B2
(45) Date of Patent: Apr. 26, 2005

(54) APPARATUS FOR CLEANING EGGS BY CONVEYING THEREOF UPON MULTIPLE CONVEYORS THROUGH WASHERS WHICH ARE VERTICALLY TIERED

(76) Inventor: Jeffrey B. Kuhl, 61 Kuhl Rd., Flemington, NJ (US) 08822

( * ) Notice: Subject to any disclaimer, the term of this patent is extended or adjusted under 35 U.S.C. 154(b) by 0 days.

(21) Appl. No.: 10/877,671

(22) Filed: Jun. 25, 2004

(65) Prior Publication Data

US 2004/0238017 A1 Dec. 2, 2004

Related U.S. Application Data

(62) Division of application No. 10/200,968, filed on Jul. 23, 2002, now Pat. No. 6,821,353.

(51) Int. Cl.[7] ................................................. B08B 3/00
(52) U.S. Cl. .............................. 134/72; 134/67; 134/68; 134/73; 134/140; 134/148; 15/3.12; 15/3.13; 15/3.14; 15/3.15; 15/3.16; 15/3.17; 15/3.18; 15/3.19; 15/3.2
(58) Field of Search .............................. 134/67, 68, 72, 134/73, 140, 148; 15/3.12, 3.13, 3.14, 3.15, 3.16, 3.17, 3.18, 3.19, 3.2

(56) References Cited

U.S. PATENT DOCUMENTS

| | | |
|---|---|---|
| 1,113,190 A | 10/1914 | Brandt |
| 1,205,117 A | 11/1916 | Stamm |
| 1,423,059 A | 7/1922 | Williamson |
| 1,542,347 A | 6/1925 | McCullough |
| 1,723,441 A | 8/1929 | Richards |
| 1,777,039 A | 9/1930 | Hatch |
| 1,780,924 A | 11/1930 | Ingraham |
| 1,955,749 A | 4/1934 | Jones |
| 1,964,275 A | 6/1934 | Seconta |
| 2,035,587 A | 3/1936 | Brandenburg |
| 2,179,474 A | 11/1939 | Stebler |
| 2,183,033 A | 12/1939 | Segrin |
| 2,199,831 A | 5/1940 | Cunning |
| 2,301,931 A | 11/1942 | Davis |
| 2,371,867 A | 3/1945 | Bayles |

(Continued)

FOREIGN PATENT DOCUMENTS

| | | |
|---|---|---|
| EP | 0328222 | 8/1989 |
| EP | 0388071 | 9/1990 |
| JP | 111554 B | 6/1990 |
| JP | 07016033 | 1/1995 |
| JP | 10117626 | 5/1998 |
| JP | 11146741 | 6/1999 |
| JP | 2001045904 A | 2/2001 |
| JP | 2001070892 A | 3/2001 |

*Primary Examiner*—Zeinab El-Arini
(74) *Attorney, Agent, or Firm*—Sperry, Zoda & Kane

(57) ABSTRACT

Apparatus for washing eggs including a housing with a first feed conveyor for receiving them through the housing inlet for conveying same to a second conveyor which transports them through an intermediate egg washer with various brushes and including a dispenser to apply cleaning solution onto eggs therebelow. Eggs are then transferred from the second conveyor to a third conveyor and transported through a lower washing station for final cleaning. Eggs then exit through a housing outlet for sanitizing and/or drying as may be necessary. The three conveyors are vertically tiered with, optionally, the second conveyor moving oppositely relatively to the first and third conveyor. In this manner a three tiered arranging of conveyors is provided. A pre-washing station can also, optionally, be included.

22 Claims, 2 Drawing Sheets

U.S. PATENT DOCUMENTS

| | | |
|---|---|---|
| 2,412,565 A | 12/1946 | Davis |
| 2,442,475 A | 6/1948 | Swanson |
| 2,538,331 A | 1/1951 | Ruzsicska |
| 2,587,730 A | 3/1952 | Hutchinson et al. |
| 2,588,787 A | 3/1952 | Wright |
| 2,632,901 A | 3/1953 | Markvsen et al. |
| 2,640,209 A | 6/1953 | Johnson |
| 2,673,361 A | 3/1954 | McCutchan |
| 2,979,746 A | 4/1961 | Willsey |
| 3,049,135 A | 8/1962 | Kuhl et al. |
| 3,099,848 A | 8/1963 | Mountz |
| 3,203,435 A | 8/1965 | Kurtz |
| 3,252,607 A | 5/1966 | Rose et al. |
| 3,349,419 A | 10/1967 | Kuhl et al. |
| 3,360,817 A | 1/1968 | Halverson |
| 3,392,414 A | 7/1968 | Cathcart |
| 3,909,290 A | 9/1975 | Peppler et al. |
| 3,973,667 A | 8/1976 | Jellema et al. |
| 4,276,977 A | 7/1981 | van Kattenbroek |
| 4,499,623 A | 2/1985 | Kuhl |
| 4,698,867 A | 10/1987 | Kuhl |
| 4,698,868 A | 10/1987 | Kuhl |
| 4,704,755 A | 11/1987 | Kuhl |
| 4,709,713 A * | 12/1987 | Kuhl .......................... 134/72 |
| 4,793,015 A | 12/1988 | van der Schoot et al. |
| 4,985,956 A | 1/1991 | van der Schoot |
| 5,240,100 A | 8/1993 | Elferink et al. |
| 5,753,493 A | 5/1998 | Wiersma |
| 5,756,139 A | 5/1998 | Harvey et al. |
| 5,758,378 A | 6/1998 | Kristensen |
| 6,029,424 A | 2/2000 | McEvoy et al. |
| 6,032,311 A | 3/2000 | Nambu |

* cited by examiner

APPARATUS FOR CLEANING EGGS BY CONVEYING THEREOF UPON MULTIPLE CONVEYORS THROUGH WASHERS WHICH ARE VERTICALLY TIERED

This application is a division of and claims filing priority of U.S. patent application Ser. No. 10/200,968, filed Jul. 23, 2002 now U.S. Pat. No. 6,821,353 on "Method And Apparatus For Cleaning Eggs By Conveying Thereof Upon Multiple Conveyors Through Washers Which Are Vertically Tiered" by the same inventor as set forth herewithin, currently pending.

BACKGROUND OF THE INVENTION

1. Field of the Invention

The present invention deals with the field of devices for cleaning fragile items such as eggs. Normally these items are conveyed and organized or accumulated into rows extending across the conveyor,. They are then passed through various egg processing configurations including cleaning mechanisms.

In egg cleaning embodiments cleaning spray is dispensed upon the eggs and the eggs are brought into contact with one or more brushes for cleaning the exterior surface thereof when traveling between a hen house and the egg packing stations. Eggs are particularly dirty including blood, dirt, feces and other unwanted contaminants on the external surface thereof immediately after the eggs are laid in a hen house and this washing step is an important step prior to candling and/or packing of the eggs. These washing stations normally extend for long sections of as long as 18 or more feet to achieve proper and thorough cleaning of the exterior surface of the eggs. The present invention provides a means for minimizing the footprint or floor space usage area of such egg washing apparatus designs.

2. Description of the Prior Art

Numerous patents have been granted for the purpose of cleaning fragile or other articles similar to eggs such as shown in U.S. Pat. No. 1,113,190 issued Oct. 13, 1914 to W. A. Brandt on an "Egg Washing And Rinsing Machine"; and U.S. Pat. No. 1,205,117 issued Nov. 14, 1916 to G. T. Stamm on a "Machine For Washing Fruit"; and U.S. Pat. No. 1,423,059 issued Jul. 18, 1922 to C. J. Williamson and assigned to Williamson Machine Company on an "Apparatus For Washing And Cleaning Eggs"; and U.S. Pat. No. 1,542,347 issued Jun. 16, 1925 to C. McCullough on an "Egg-Washing Machine"; and U.S. Pat. No. 1,723,441 issued Aug. 6, 1929 to J. H. Richards on a "Machine For Cleaning Fruit"; and U.S. Pat. No. 1,777,039 issued Sep. 30, 1930 to H. B. Hatch and assigned to Florida Citrus Machinery Company on a "Rubbing Apparatus"; and U.S. Pat. No. 1,780,924 issued Nov. 11, 1930 to H. A. Ingraham on a "Fruit Cleaning Machine"; and U.S. Pat. No. 1,955,749 issued Apr. 24, 1934 to L. E. Jones and assigned to Food Machinery Corporation on a "Brushing Machine"; and U.S. Pat. No. 1,964,275 issued Jun. 26, 1934 to P. Secondo on a "Fruit Washing Machine"; and U.S. Pat. No. 2,035,587 issued Mar. 31, 1936 to H. J. Brandenburg on a. "Transverse Fruit Brusher"; and U.S. Pat. No. 2,179,474 issued Nov. 7, 1939 to F. Stebler and assigned to Food Machinery Corporation on a "Fruit Treating Machine"; and U.S. Pat. No. 2,183,033 issued Dec. 12, 1939 to O. E. Segrin on a "Candy Brushing Machine"; and U.S. Pat. No. 2,199,831 issued May 7, 1940 to T. G. Cunning and assigned to Brogdex Company on an "Apparatus For Rubbing Or Brushing Fruit And The Like"; and U.S. Pat. No. 2,301,931 issued Nov. 17, 1942 to R. S. Davis on an "Egg Cleaning Machine"; and U.S. Pat. No. 2,371,867 patented Mar. 20, 1945 to J. R. Rayles and assigned to Industrial Patents Corporation on an "Egg Washing Machine"; and U.S. Pat. No. 2,412,565 patented Dec. 17, 1946 to R. S. Davis on an "Egg Cleaning Machine"; and U.S. Pat. No. 2,442,475 issued Jun. 1, 1948 to O. W. Swanson on an "Egg Washing Machine"; and U.S. Pat. No. 2,538,331 issued Jan. 16, 1951 to R. H. Ruzsicska on an "Egg Washing Machine"; and U.S. Pat. No. 2,587,730 issued Mar. 4, 1952 to H. A. Hutchinson et al and assigned to Hutchinson on an "Egg Cleaning Machine"; and U.S. Pat. No. 2,588,787 issued Mar. 11, 1952 to F. B. Wright and assigned to Research Corporation on an "Egg Drier"; and U.S. Pat. No. 2,632,901 issued to A. Markusen et al on Mar. 31, 1953 on an "Egg Washing Machine And Roller Therefor"; and U.S. Pat. No. 2,640,209 issued Jun. 2, 1953 to G. W. Johnson and assigned to Gordon Johnson Company on an "Egg Washing Machine"; and U.S. Pat. No. 2,673,361 issued Mar. 30, 1954 to E. E. McCutchan and assigned to Robert E. McCutchan and Donald S. McCutchan on an "Egg Washer"; and U.S. Pat. No. 2,979,746 issued Apr. 18, 1961 to C. H. Willsey and assigned to Seymour Foods, Inc. on an "Egg Washing Machine"; and U.S. Pat. No. 3,049,135 issued Aug. 14, 1962 to H. Y. Kuhl et al on an "Egg Cleaner"; and U.S. Pat. No. 3,099,848 issued Aug. 6, 1963 to P. A. Mountz and assigned to Lathan Manufacturing Company on an "Article Washer"; and U.S. Pat. No. 3,203,435 issued Aug. 31, 1965 to J. S. Kurtz and assigned to Automatic Poultry Feeder Company on an "Egg Washing Apparatus"; and U.S. Pat. No. 3,252,607 issued May 24, 1966 to B. W. Rose et al and assigned to FMC Corporation on a "Machine For Handling Eggs"; and U.S. Pat. No. 3,349,419 issued Oct. 31, 1967 to H. Y. Kuhl et al on "Egg Washing Equipment"; and U.S. Pat. No. 3,360,817 issued Jan. 2, 1968 to J. E. Halverson on an "Egg Cleaning Machine"; and U.S. Pat. No. 3,392,414 issued Jul. 16, 1968 to J. C. Cathcart on an "Egg Cleaning Apparatus"; and U.S. Pat. No. 3,909,290 issued Sep. 30, 1975 to W. S. Peppler and assigned to Diamond International Corporation on a "Method And Means For Washing Eggs, Including Tilted Brushes"; and U.S. Pat. No. 3,973,667 issued Aug. 10, 1976 to A. Jellema et al and assigned to Staalkat B. V. on an "Apparatus For Vertically Transporting Eggs Or Like Articles"; and U.S. Pat. No. 4,276,977 issued Jul. 7, 1981 to H. J. van Kattenbrock and assigned to Moba Holding Barneveld B. V. on a "Distribution And Conveyor Apparatus For Eggs"; and U.S. Pat. No. 4,499,623 issued Feb. 19, 1985 to J. B. Kuhl and assigned to Henry Y. Kuhl on an "Egg Cleaning Apparatus"; and U.S. Pat. No. 4,698,867 issued Oct. 13, 1987 to H. Kuhl on an "Egg Washing Means Using Staggered Sized Flat Brushes"; and U.S. Pat. No. 4,698,868 issued Oct. 13, 1987 to H. Y. Kuhl on an "Egg Washing Conveyor Apparatus"; and U.S. Pat. No. 4,704,755 issued Nov. 10, 1987 to J. B. Kuhl on an "Apparatus For Cleaning Eggs"; and U.S. Pat. No. 4,793,015 issued Dec. 27, 1988 to J. van der Schoot et l and assigned to Staalkat B. V. on an "Apparatus For Cleaning Eggs And Like Articles"; and U.S. Pat. No. 4,985,956 issued Jan. 22, 1991 to J. van der Schoot and assigned to Staalkat B. V. on a "Washing Machine Vapor Exhaust"; and U.S. Pat. No. 5,240,100 issued Aug. 31, 1993 to H. Elferink et al and assigned to FPS Food Processing Systems B. V. on an "Apparatus For Receiving Or Transferring, Vertically Transporting And Delivering Articles Such As Eggs"; and U.S. Pat. No. 5,753,493 issued May 19, 1998 to J. G. Wiersma and assigned to Nouveau Technologies, Inc. on an "Egg Washing Decontamination Process"; and U.S. Pat. No. 5,756,139 issued May 26, 1998 to A. J. Harvey et al and assigned to Solvay Interox Limited on an "Egg Washing And Disinfection Process"; and U.S. Pat. No. 5,758,378 issued Jun. 2, 1998 to J. Kristensen and assigned to Sanovo Engineering A/S on a "Machine For Washing Eggs"; and U.S. Pat. No. 6,029,424 issued Feb. 29, 2000 to J. McEvoy et al and assigned to Diamond Automations, Inc. on a "High-Speed Egg Processing System And Method"; and U.S. Pat. No. 6,032,311 issued Mar. 7, 2000 to K. Nambu and assigned to Nambu Electric Co., Ltd. on an "Egg Washing Apparatus"; and European Patent EP0328222 B1 issued May 22, 1991 to J. Derksen on an "Egg-Washer"; and European Patent EP0388071 A1 issued Sep. 19, 1990 to R. Palmer on an "Egg-Cleaning Apparatus And Method"; and Japanese Patent JP07016033 A issued Jan. 20, 1995 to K. Kiyoshi et al on a "Method For Washing Egg, Egg Washer And System For Treating Shell Egg"; and Japanese Patent JPZ10117626 A issued May 12, 1998 to T. Masao on an "Egg Washing And Drying Device"; and Japanese Patent JP11146741 A issued Jun. 2, 1999 to W. Daisuke on a "Washer For Egg"; and Japanese Patent JP11155413 A issued Jun. 15, 1999 to Y. Takeshi et al on an "Egg Treating Machine"; and Japanese Patent JP200100070892 A issued Mar. 21, 2001 to H. Shinichi on a "Washing Method By Combination Of Spiral Rotary Brush And Cylindrical Rotary Brush"; and Japanese Patent JP11235135 A issued Aug. 31, 1999 to S. Hisahide on an "Egg Shell Washing And Sterilizing Apparatus"; and Japanese Patent JP2001045904 A issued Feb. 20, 2001 to A. Nobuo et al on a "Method For Washing Egg And Device For Washing Egg".

SUMMARY OF THE INVENTION

The present invention provides a multi-tiered egg washing apparatus which is vertically oriented with the individual washing stations positioned vertically above one another. The device includes preferably a housing means defining an inlet wall and an outlet wall separated from one another in such a manner as to define a washing chamber therebetween within the housing. The inlet wall further defines an inlet opening to allow entry of eggs into the washing chamber for cleaning. The outlet wall defines an outlet opening to allow exiting of eggs from the washing chamber after cleaning.

The inlet opening and the outlet opening and the washing chamber are preferably all in fluid flow communication with respect to one another to allow eggs to enter, be washed and exit from the housing while at the same time allowing cleaning fluids to contact the eggs at all washing stations therein.

The washing chamber preferably includes an upper section, an intermediate section and a lower section with the upper section being at the highest elevation and the lower section being at the lowest elevation. The inlet opening is positioned within the upper section of the washing chamber and the outlet opening is positioned within the lower section of the washing chamber in order to allow the eggs to enter and use gravity to facilitate flow and movement from one conveyor to the next and from one washing station to the next.

A first conveyor is preferably positioned within the upper section of the housing chamber. This conveyor is adapted to receive eggs after passing thereof through the inlet for conveying them generally away from the inlet wall toward the outlet wall. This first conveying means preferably comprises a open mesh belt configuration that can be of a plastic or other material. It has been found to facilitate supporting and movement of eggs during this initial conveying step. Other belts could be used but this is the preferred type of belt for this first conveyor.

An intermediate egg washing device may also be positioned within the intermediate section to facilitate cleaning of eggs being conveyed therethrough. This intermediate egg washing device can include preferably spraying nozzles for dispensing cleaning solution upon the eggs conveyed thereadjacent and preferably will also include some type of a brush for cleaning the external surface of the eggs. Such brush can comprise a cylindrical brush, or a flat brush, or end brushes for specifically cleaning the ends of the eggs.

A second conveyor is preferably included for receiving eggs from the first conveyor and conveying thereof generally away from the outlet wall toward the inlet wall through the intermediate section to allow washing thereof by the intermediate egg washing means. The second conveyor is preferably oriented such as to move in a direction generally opposite relative to the first conveyor thereabove in order to facilitate washing of eggs traveling thereon. To facilitate this transition, the second conveyor can include an intermediate angular transition conveyor which is adapted to receive eggs after traveling through the upper section to facilitate movement thereof onto the second conveyor. This intermediate angular transition conveyor is preferably angled downwardly from the upper section toward the intermediate section in order to facilitate downward movement of eggs from the first conveyor to the second conveyor.

A lower washing station is positioned within the lower section for facilitating cleaning of eggs being conveyed therethrough. A third conveyor is adapted to receive eggs from the intermediate conveyor for conveying thereof generally away from the inlet wall toward the outlet wall through the lower section to allow washing thereof by the lower egg washing station. The third conveyor is preferably oriented to move in a direction generally opposite relative to the second conveyor thereabove to facilitate washing of eggs traveling thereon and minimize the footprint of the apparatus. The third conveyor preferably includes a lower angular transition conveyor which is adapted to receive eggs after being conveyed through the intermediate section for urging movement thereof onto the third conveyor. The third angular transition conveyor is preferably oriented such as to be angled downwardly from the intermediate section toward the lower section in order to facilitate downward movement of eggs from the intermediate conveyor to the third conveying means.

In the present invention it is preferred but not required to include a pre-washing apparatus. Preferably this apparatus will be positioned within the upper section of the washing chamber for pre-washing of eggs traveling therethrough upon the first conveyor. This pre-washer, if included, will preferably have a plurality of pre-washing nozzles positioned above the first conveyor for wetting of eggs being conveyed through the upper section in order to facilitate washing.

The apparatus of the present invention can further include an accumulator positioned between the first and second conveyors. The accumulator is adapted to receive eggs from the first conveyor for dividing thereof into rows of separately positioned eggs for conveying thereof to facilitate egg washing. The inclusion of this accumulator is optional.

The accumulator will preferably be for the purpose of delivering eggs onto the second conveyor and for this purpose will include a separate accumulator conveyor means. This accumulator conveyor is adapted to receive eggs from the first conveyor for unstacking thereof and organizing thereof within the accumulator. Preferably the accumulator conveying means will be operated at a surface movement speed which is greater than the speed of the movement surface of the first conveyor in order to facilitate organizing of eggs arranged separately, individually and in rows by the accumulator. The accumulator can also include an accumulator head for dividing of the eggs into individual rows.

The apparatus of the present invention can be used for various methods of washing eggs but will preferably initially convey a plurality of eggs to be washed upon a plastic opened mesh conveyor belt through the upper section of an egg washing chamber in a primary direction. The eggs will then optionally be pre-washed during this first conveying by the spraying of a cleaning solution by a plurality of nozzles from above onto the eggs as they are first conveyed through the upper section of the egg washing chamber. The eggs are then transported from the first conveyor to an accumulating conveyor. These eggs are then accumulated into rows of individual eggs stacked singly prior to movement to the second conveyor. The eggs are then moved from the accumulating conveyor to the second conveyor when so organized. This second conveyor is positioned therebelow in the intermediate section of the washing chamber below the upper section. An intermediate angular transition conveying of the eggs can be included oriented on a downward incline after the first conveyor to facilitate movement of eggs from the upper section of the egg washing chamber to the intermediate section thereof to facilitate second conveying.

This second conveying of the so moved eggs will be conducted in a secondary direction which is oriented generally oppositely relative to the primary direction to facilitate egg washing. The eggs are washed at an intermediate egg washing station during this second conveying movement to remove unwanted contaminants from the exterior thereof. The eggs so conveyed are then relocated from the second conveyor onto the third conveyor positioned therebelow in the lower section of the washing chamber. This relocation can be enhanced by the lower angular transition conveying of the eggs on a downwardly oriented incline after the second conveying is completed to facilitate gradual movement of the eggs from the intermediate section of the egg washing chamber to the lower section of the egg washing chamber.

In the lower section of the egg washing chamber third conveying of the relocated eggs is conducted in the primary direction at an elevation immediately below the intermediate section for facilitating further egg washing. The eggs are then washed in the lower washing station during third conveying thereof through the lower section of the egg washing chamber to facilitate removal of unwanted contaminants on the exterior surface of the eggs. Thereafter the washing of the eggs is completed and the eggs will exit from the washing chamber at a location below the height when they first entered immediately prior to first conveying thereof.

It is an object of the present invention to provide a method and apparatus for washing eggs by conveying thereof upon multiple conveyors through washers which are vertically tiered wherein the use of floor space is minimized by providing multiple vertically stacked washing stations.

It is an object of the present invention to provide a method and apparatus for washing eggs by conveying thereof upon multiple conveyors through washers which are vertically tiered wherein cleaning solution can be recycled.

It is an object of the present invention to provide a method and apparatus for washing eggs by conveying thereof upon multiple conveyors through washers which are vertically tiered wherein the same cleaning solution can be used for various different stations vertically oriented within the egg washing chamber.

It is an object of the present invention to provide a method and apparatus for washing eggs by conveying thereof upon multiple conveyors through washers which are vertically tiered wherein eggs are carried upon multiple conveyors stacked vertically above one another in generally oppositely oriented directions.

It is an object of the present invention to provide a method and apparatus for washing eggs by conveying thereof upon multiple conveyors through washers which are vertically tiered wherein as much as 18 or more feet of linear egg washing can be achieved within a six foot long or shorter floor space footprint.

It is an object of the present invention to provide a method and apparatus for washing eggs by conveying thereof upon multiple conveyors through washers which are vertically tiered wherein pre-washing can be optionally included to minimize adherence of dirt and retention problems of contaminants resulting from drying thereof on the external surfaces of eggshells.

It is an object of the present invention to provide a method and apparatus for washing eggs by conveying thereof upon multiple conveyors through washers which are vertically tiered wherein many different types of egg washing brushes can be utilized at the various stations within the vertically tiered washing stations of the present invention.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
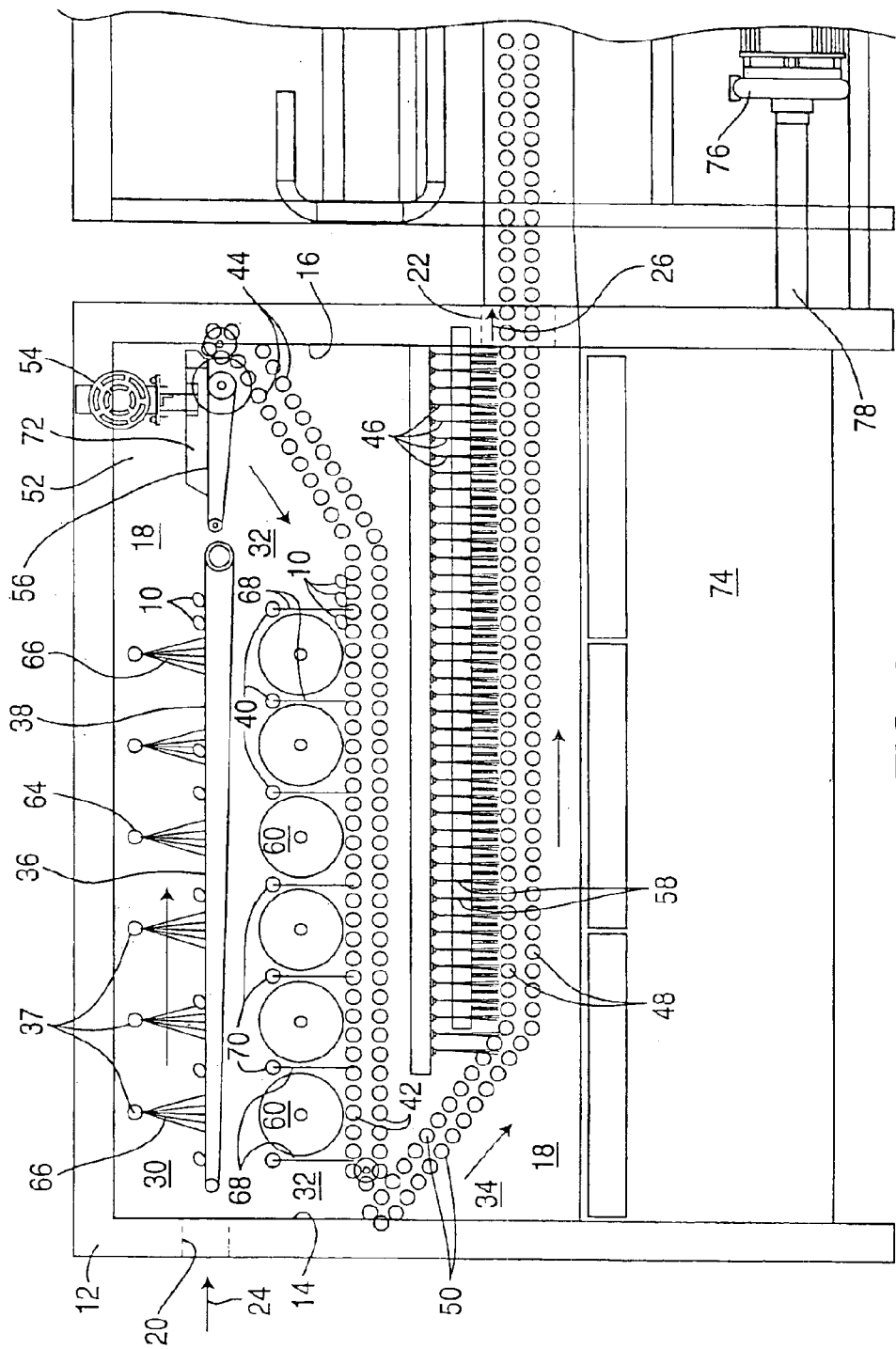
FIG. 1 is a front plan view of an embodiment of the apparatus and method of the present invention.

The present invention provides a unique apparatus for practicing of a method for the washing of eggs wherein they are conveyed through multiple conveyors which are vertically stacked or tiered upon one another to minimize usage of floor space and to maximize usage of washing solutions.

In the present invention eggs 10 are initially conveyed into an egg housing 12. The egg housing 12 preferably defines an inlet wall 14 wherein eggs are admitted as shown by egg entry arrow 24 through an inlet opening 20 defined therein. Similarly the outlet wall 16 will define an outlet opening 22 therein through which eggs may exit as shown by arrow 26.

The egg housing 12 will define a washing chamber 18 positioned generally between the inlet wall 14 and the outlet 16 thereof. This washing chamber 18 is preferably divided into three sections. An upper section 30 extends throughout the upper area thereof and a lower section 34 extends throughout the lower area thereof and an intermediate section 32 extends throughout the portion of the washing chamber 18 which is below the upper section 30 and above the lower section 34.

With this invention eggs are initially passed through the inlet opening 20 to be positioned upon a first conveyor 36. First conveyor 36 is the delivery conveyor which delivers eggs to the first washing station. This delivery or first conveyor 36 can include a pre-washing station thereabove. This pre-washing means 37 preferably will include a plurality of pre-washing nozzles 64 for spraying of pre-washing solution 66 downwardly therefrom onto the eggs 10 traveling upon the first conveyor 36. First conveyor 36 is preferably positioned within the upper section 30 of egg housing 12.

The use of such a pre-washing station 37 is optional. It is not required. However, it has been found to be advantageous for minimizing the retention of dirt and other contaminants upon the external surface of the shell of the eggs 10. The first conveyor 36 preferably comprises a plastic opened mesh belt 38 made from a material such as polypropylene. This material to be chosen for the first conveyor 36 has been found to have significant advantages including conveyor movement, easy washability and full and effective support of the eggs while being first conveyed.

The eggs will move from the first conveyor 36 to the second conveyor 42. This second conveyor 42 is preferably positioned in the intermediate section 32 of housing 12 and will include an intermediate egg washing means or station 40 thereadjacent. Intermediate washing means 40 can include a plurality of intermediate nozzles 70 spraying intermediate washing solution 68 downwardly onto eggs being conveyed thereunder. As eggs move upon the second conveyor 42 they will be washed by the intermediate egg washing means 40. Preferably second conveyor 42 will move in a direction oppositely and below relative to the first conveyor 36 in such a manner as to maximize the use of floor space and to receive any pre-washing solution 66 which may move downwardly from eggs pre-washed thereabove if such a pre-washing station is utilized in the specific embodiment. Each washing level will include cleaning liquid dispensing means particular to that level which can be supplemented by washing or pre-washing solution draining downwardly from washing or pre-washing stations thereabove for enhancing the overall washing operation.

It should be noted that the direction of movement of the second conveyor 42 is preferably directly opposite and immediately below the first conveyor 36.

Transition of movement of the eggs 10 from the first conveyor 36 to the second conveyor 42 can be significantly enhanced by the inclusion of an intermediate angular transition conveyor 44. Such a conveyor will receive eggs at a level close to the level of conveyance by the first conveyor 36 and will move the eggs downwardly at the angle of the conveyor 44 until the eggs are at the proper height within the egg housing 12 to be moved onto the second conveyor 42. In this manner this intermediate angular transition conveyor 44 will allow smooth transition of eggs from the higher elevation of the first conveyor 36 to the lower height of the second conveyor 42.

The present invention will also include a third conveyor 48 positioned in the lower section 34 of egg housing 12 immediately below the second conveyor 42. This third conveyor 48 will move in the primary direction which is the same direction as the first conveyor 36 which is opposite to the direction of movement of the second conveyor 42. The third conveyor 48 will receive eggs 10 after movement through the intermediate egg washing station 40 by the second conveyor 42 for further washing thereof by conveying of the eggs through the lower egg washing means 46. Lower egg washing means 46 will be positioned preferably immediately below the intermediate egg washing means 40 such as to receive cleaning solution used in that station and also to re-use pre-wash cleaning solution 66 which may be received if a pre-wash station is included in the upper section 30 thereabove.

The third conveyor 48 will move the eggs toward the outlet wall 16 such that after they complete their movement through the lower egg washing station 46 they will be positioned adjacent to the outlet opening 22 to facilitate exiting of the eggs 10 from the egg housing 12.

Movement of eggs from the second conveyor 42 to the third conveyor 48 is greatly enhanced by the inclusion of a lower angular transition conveyor 50. This transition conveyor 50 is preferably oriented angularly to move from an elevation approximately equal to the second conveyor 42 to a lower elevation approximately equal to that of the third conveyor 48. In this manner the lower angular transition conveyor 50 will receive eggs in the intermediate section 32 and will transport these eggs to the lower section 34 thereby facilitating the change in vertical position of the eggs as they move more gently from the second conveyor 42 to the third conveyor 48.

Another optional configuration of the present invention is an accumulator 52. Such an accumulator 52 can be positioned between the first conveyor 36 and the second conveyor 42 for the purpose of dividing the eggs into rows and organizing them singly in an unstacked manner upon an accumulating conveyor 56. The accumulator head 54 will preferably include dividers 72 which will separate the eggs into rows. Also the accumulator conveyor 56 will preferably be operated at a speed somewhat greater than the speed of operation of the first conveyor 36 in order to prevent stacking of the eggs at the point of transition where they move from the first conveyor 36 to the accumulating conveyor 56.

Sensing means can also be included in the present invention for the purpose of sensing an unwanted buildup of eggs at the transition between the first conveyor 36 and the accumulating conveyor 56 which may stop movement of the first conveyor 36 temporarily until the accumulator has had a chance to orient the excess accumulated number of eggs in rows and in an unstacked manner. The brushes used for cleaning in the various washing stations of the present invention can comprise flat washer brushes 58 of various configurations which may or may not include scallop designs therein. These brushes can also comprise cylindrical washers 60 such as shown in FIG. 1. These cylindrical washers are often positioned to be rotatable and yet are not driven to allow the eggs when moving thereby to contact the cylindrical brushes for gentle scrubbing thereof. Also egg end brushes can be included. These egg end brushes can be positioned in one, two, all or none of the washing stations of the present invention. These end brushes are best shown in U.S. Pat. No. 4,698,868 issued Oct. 13, 1987 on an Egg Washer Conveying Apparatus which has been cited hereabove.

In operation the apparatus of the present invention will first convey a plurality of eggs 10 to be washed preferably upon a plastic open mesh first conveyor belt 36 through the upper section 30 of an egg washing chamber 18 in a primary direction shown extending to the right in FIG. 1. The eggs 10 can optionally can be pre-washed during this first conveying by the inclusion of pre-washed nozzle 64 which sprays a pre-washed solution 66 downwardly on the eggs being conveyed by the first conveyor. The eggs 10 are then transported from the first conveyor onto an accumulating conveyor 56.

The eggs 10 are then divided by the accumulator 52 and, in particular, the accumulator head 54 while traveling upon the accumulator conveyor 56. Preferably this conveyor 56 is operated at a speed faster than the speed of operation of the first conveyor 36 in order to facilitate the dividing of eggs 10 into spatially disposed rows as required.

The eggs 10 will then be moved from the accumulating conveyor 56 to the second conveyor 42 which is located therebelow in the intermediate section 32 of the washing chamber 18 which is located below the upper section 30 thereof. This movement is greatly facilitated by the inclusion of an intermediate angular transition conveyor 44 which moves the eggs 10 on a downward incline from the upper section 30 to the intermediate section 32 onto the second conveyor 42. The eggs 10 will then be moved by the second conveyor 42 in a secondary direction generally extending to the left as shown in FIG. 1. This secondary direction will be approximately opposite to the primary direction and immediately therebelow. This second conveyor will be positioned within the intermediate section of the egg washing chamber. Eggs will be washed during this second conveying to facilitate removal of unwanted contaminants from the exterior thereof. At the end of this second conveyance the eggs will be relocated to the third conveyor 48 preferably by the inclusion of a lower angular transition conveyor 50 which moves the eggs 10 on a gradually downward incline to ease the change in vertical elevation of the eggs during movement from the second conveyor 42 to the third conveyor 48. The so relocated eggs positioned on the third conveyor 48 will then be moved in the primary direction in the lower section of the washing chamber which is immediately below the intermediate section for facilitating washing of the eggs therewithin. After the lower washing of the eggs is completed the eggs will be moved by the third conveyor 48 to a position immediately adjacent to the outlet wall 16 such that they can exit through the outlet opening 22 as shown by exit arrow 26.

It is important to appreciate that with this process the footprint of the overall washing station is between 25% and 50% of the required footprint for conventional linear non-tiered washing configurations. Also the present invention has a unique advantage of allowing the re-use of cleaning solutions from previous washing steps which occur above the current ongoing washing step without requiring the use of any recirculating pump or accumulation tank. The present invention does include a reservoir or tank 74 along with a pump 76 and return lines 78 for continuously recycling of cleaning fluids after they pass through all of the washers. Once these solutions are re-introduced in one of the washers at a higher elevation they will then be utilized in each successive washing station prior to re-entry into the recirculation tank 74. This is another important distinct advantage of the present invention.

Figure 2:
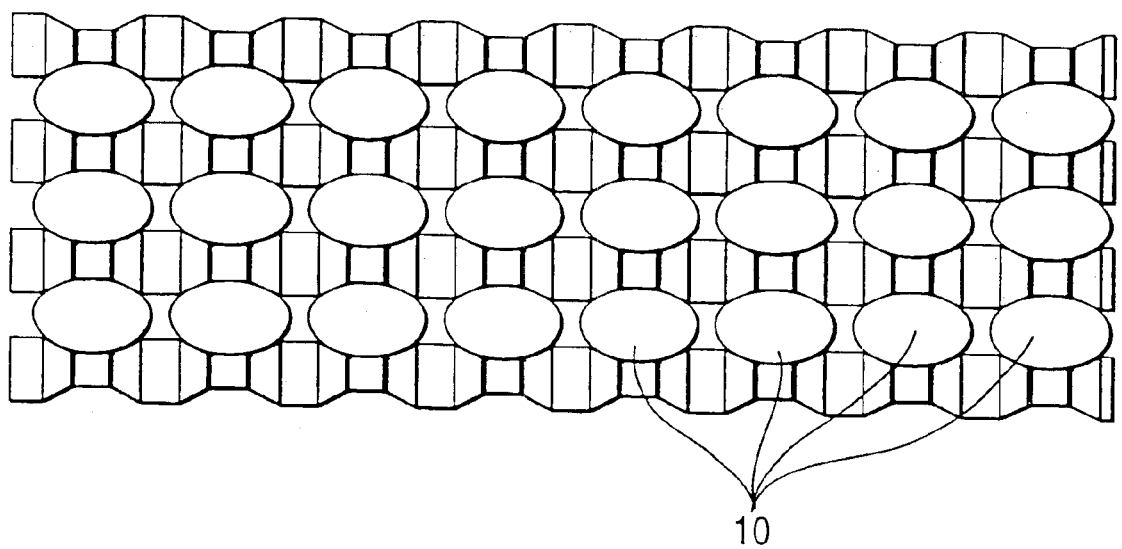
FIG. 2 is a top plan view of an embodiment of the conveyor used in the primary washing sections of the present invention showing the eggs arranged in rows singly.

FIG. 2 illustrates a top plan view of an embodiment of the first conveyor 36 of the apparatus of the present invention showing the individual eggs 10 arranged thereupon spaced apart from one another in laterally extending rows in order to facilitate washing thereof.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A multi-tiered vertically oriented egg washing apparatus comprising:
    A. a housing means including an inlet wall means and an outlet wall means spatially disposed from one another and defining a washing chamber means therebetween, said inlet wall means further defining an inlet opening means therein for facilitating entry of eggs into said washing chamber means for cleaning thereof, said outlet wall means defining an outlet opening means therein for facilitating exiting of eggs from said washing chamber means after cleaning thereof, said inlet opening means and said outlet opening means and said washing chamber means being in fluid flow communication with respect to one another to facilitate movement of eggs therethrough for cleaning, said washing chamber means defining an upper section and an intermediate section positioned therebelow, said washing chamber means further including a lower section positioned below said intermediate section;
    B. a first conveying means positioned within said upper section of said washing chamber means, said first conveying means being adapted to receive eggs after passing thereof through said inlet means for conveying thereof away from said inlet wall means toward said outlet wall means;
    C. an intermediate egg washing means positioned within said intermediate section for cleaning of eggs being conveyed therethrough;
    D. a second conveying means adapted to receive eggs from said first conveying means for conveying thereof away from said outlet wall means toward said inlet wall means through said intermediate section to allow washing thereof by said intermediate egg washing means;
    E. a lower egg washing means positioned within said lower section for cleaning of eggs being conveyed therethrough; and
    F. a third conveying means adapted to receive eggs from said second conveying means for conveying thereof away from said inlet wall means toward said outlet wall means through said lower section to allow washing thereof by said lower egg washing means.

2. A multi-tiered vertically oriented egg washing apparatus as defined in claim 1 wherein said second conveying means is oriented to move in a direction opposite relative to said first conveying means thereabove and relative to said third conveying means therebelow to facilitate washing of eggs traveling thereon.

3. A multi-tiered vertically oriented egg washing apparatus as defined in claim 1 further comprising a pre-washing means positioned within said upper section of said washing chamber means for prewashing of eggs traveling therethrough upon said first conveying means.

4. A multi-tiered vertically oriented egg washing apparatus as defined in claim 3 wherein said pre-washing means includes a plurality of pre-washing nozzles positioned above said first conveying means for wetting of eggs being conveyed thereon through said upper section to facilitate washing thereof.

5. A multi-tiered vertically oriented egg washing apparatus as defined in claim 1 further including an accumulator means positioned between said first conveying means and said second conveying means, said accumulator means adapted to receive eggs from said first conveying means for dividing thereof into rows of separately positioned eggs for conveying thereof to facilitate washing, said accumulator means adapted to deliver eggs onto said second conveying means for washing thereof.

6. A multi-tiered vertically oriented egg washing apparatus as defined in claim 5 wherein said accumulator means includes an accumulator conveying means adapted to receive eggs from said first conveying means for unstacking thereof and organizing thereof within said accumulator.

7. A multi-tiered vertically oriented egg washing apparatus as defined in claim 6 wherein said accumulator conveying means is operated at a speed of surface movement faster than the speed of surface movement of said first conveying means to facilitate organizing of eggs arranged separately in rows by said accumulator means.

8. A multi-tiered vertically oriented egg washing apparatus as defined in claim 1 wherein said intermediate egg washing means includes cylindrical washing brushes extending laterally across said second conveying means and being movable to facilitate washing of eggs being conveyed thereunder toward said inlet wall means.

9. A multi-tiered vertically oriented egg washing apparatus as defined in claim 1 wherein said lower egg washing means includes cylindrical washing brushes extending laterally across said third conveying means to facilitate washing of eggs being conveyed thereunder toward said outlet wall means.

10. A multi-tiered vertically oriented egg washing apparatus as defined in claim 1 wherein said intermediate egg washing means includes flat washing brushes extending laterally across said intermediate conveying means and being movable to facilitate washing of eggs being conveyed thereunder toward said inlet wall means.

11. A multi-tiered vertically oriented egg washing apparatus as defined in claim 1 wherein said lower egg washing means includes flat washing brushes extending laterally across the direction of movement of said third conveying means to facilitate washing of eggs being conveyed thereunder toward said outlet wall means.

12. A multi-tiered vertically oriented egg washing apparatus as defined in claim 1 wherein said intermediate egg washing means includes end brushing means which are movable to facilitate washing eggs being conveyed therethrough upon said second conveying means.

13. A multi-tiered vertically oriented egg washing apparatus as defined in claim 1 wherein said lower egg washing means includes end brushing means which are movable to facilitate washing eggs being conveyed therethrough upon said third conveying means.

14. A multi-tiered vertically oriented egg washing apparatus as defined in claim 1 wherein said inlet opening means is positioned within said upper section of said washing chamber means and wherein said outlet opening means is positioned therebelow within said lower section of said washing chamber means.

15. A multi-tiered vertically oriented egg washing apparatus as defined in claim 1 wherein said first conveying means includes a plastic open mesh belt for supporting of eggs being conveyed thereupon.

16. A multi-tiered vertically oriented egg washing apparatus as defined in claim 1 wherein said second conveying means includes an intermediate angular transition conveyor adapted to receive eggs after traveling through said upper section for movement thereof onto said second conveying means, said intermediate angular transition conveyor being angled downwardly from said upper section toward said intermediate section to facilitate downward movement of eggs from said first conveying means to said second conveying means.

17. A multi-tiered vertically oriented egg washing apparatus as defined in claim 1 wherein said third conveying means includes a lower angular transition conveyor adapted to receive eggs after being conveyed through said intermediate section for urging movement thereof onto said third conveying means, said third angular transition conveyor being angled downwardly from said intermediate section toward said lower section to facilitate downward movement of eggs from said intermediate conveying means to said third conveying means.

18. A multi-tiered vertically oriented egg washing apparatus as defined in claim 1 wherein said intermediate egg washing means further includes cleaning solution dispensed downwardly therefrom to facilitate washing of eggs traveling upon said second conveyor means therewithin and wherein said intermediate egg washing means is positioned immediately above said lower egg washing means to allow said cleaning solution from said intermediate egg washing means to flow downwardly onto eggs traveling upon said third conveyor means to facilitate cleaning of eggs by said lower egg washing means.

19. A multi-tiered vertically oriented egg washing apparatus as defined in claim 1 further comprising a pre-washing means positioned within said upper section of said washing chamber means for prewashing of eggs traveling therethrough upon said first conveying means, said pre-washing means including cleaning solution dispensed downwardly therefrom to facilitate washing of eggs traveling upon said first conveyor means, said pre-washing means being positioned above said intermediate egg washing means and said lower egg washing means to allow cleaning solution used by said pre-washing means to flow downwardly onto eggs traveling upon said second conveying means and said third conveying means to facilitate cleaning of eggs by said intermediate egg washing means and said lower egg washing means, respectively.

20. A multi-tiered vertically oriented egg washing apparatus as defined in claim 1 further including a cleaning solution recirculation means comprising:
   A. a reservoir means positioned below said intermediate egg washing means and said lower egg washing means to receive and gather cleaning solution therefrom;
   B. a return line means extending from said reservoir means to said intermediate washing means and said lower washing means to facilitate supplying of cleaning solution thereto; and
   C. a pump means operatively connected to said return line means to pump cleaning solution therealong from said reservoir means to said intermediate washing means and said lower washing means.

21. A multi-tiered vertically oriented egg washing apparatus comprising:
   A. a housing means including an inlet wall means and an outlet wall means spatially disposed from one another and defining a washing chamber means therebetween, said inlet wall means further defining an inlet opening means therein for facilitating entry of eggs into said washing chamber means for cleaning thereof, said outlet wall means defining an outlet opening means therein for facilitating exiting of eggs from said washing chamber means after cleaning thereof, said inlet opening means and said outlet opening means and said washing chamber means being in fluid flow communication with respect to one another to facilitate movement of eggs therethrough for cleaning, said washing chamber means defining an upper section and an intermediate section positioned therebelow, said washing chamber means further including a lower section positioned below said intermediate section;

B. a first conveying means positioned within said upper section of said washing chamber means, said first conveying means being adapted to receive eggs after passing thereof through said inlet means for conveying thereof away from said inlet wall means toward said outlet wall means;

C. an intermediate egg washing means positioned within said intermediate section for cleaning of eggs being conveyed therethrough;

D. a second conveying means adapted to receive eggs from said first conveying means for conveying thereof generally away from said outlet wall means toward said inlet wall means through said intermediate section to allow washing thereof by said intermediate egg washing means, said second conveying means being oriented to move in a direction opposite relative to said first conveying means thereabove to facilitate washing of eggs traveling thereon;

E. a lower egg washing means positioned within said lower section for cleaning of eggs being conveyed therethrough;

F. a third conveying means adapted to receive eggs from said intermediate conveying means for conveying thereof away from said inlet wall means toward said outlet wall means through said lower section to allow washing thereof by said lower egg washing means, said third conveying means being oriented to move in a direction opposite relative to said second conveying means thereabove to facilitate washing of eggs traveling thereon;

G. a pre-washing means positioned within said upper section of said washing chamber means for prewashing of eggs traveling therethrough upon said first conveying means, said pre-washing means including a plurality of pre-washing nozzles positioned above said first conveying means for wetting of eggs being conveyed thereon through said upper section to facilitate washing thereof; and H. an accumulator means positioned between said first conveying means and said second conveying means, said accumulator means adapted to receive eggs from said first conveying means for dividing thereof into rows of separately positioned eggs for conveying thereof to facilitate egg washing, said accumulator means adapted to deliver eggs onto said second conveying means for washing thereof, said accumulator means including an accumulator conveying means adapted to receive eggs from said first conveying means for unstacking thereof and organizing thereof within said accumulator wherein said accumulator conveying means is operated at a speed of surface movement faster than the speed of surface movement of said first conveying means to facilitate organizing of eggs arranged separately in rows by said accumulator means.

22. A multi-tiered vertically oriented egg washing apparatus comprising:

A. a housing means including an inlet wall means and an outlet wall means spatially disposed from one another and defining a washing chamber means therebetween, said inlet wall means further defining an inlet opening means therein for facilitating entry of eggs into said washing chamber means for cleaning thereof, said outlet wall means defining an outlet opening means therein for facilitating exiting of eggs from said washing chamber means after cleaning thereof, said inlet opening means and said outlet opening means and said washing chamber means being in fluid flow communication with respect to one another to facilitate movement of eggs therethrough for cleaning, said washing chamber means defining an upper section and an intermediate section positioned therebelow, said washing chamber means further including a lower section positioned below said intermediate section, said inlet opening means being positioned within said upper section of said washing chamber means and said outlet opening means being positioned therebelow within said lower section of said washing chamber means;

B. a first conveying means positioned within said upper section of said washing chamber means, said first conveying means being adapted to receive eggs after passing thereof through said inlet means for conveying thereof away from said inlet wall means toward said outlet wall means, said first conveying means including a plastic open mesh belt for facilitating supporting and movement of eggs being conveyed thereupon;

C. an intermediate egg washing means positioned within said intermediate section for cleaning of eggs being conveyed therethrough;

D. a second conveying means adapted to receive eggs from said first conveying means for conveying thereof away from said outlet wall means toward said inlet wall means through said intermediate section to allow washing thereof by said intermediate egg washing means, said second conveying means being oriented to move in a direction opposite relative to said first conveying means thereabove to facilitate washing of eggs traveling thereon, said second conveying means including an intermediate angular transition conveyor adapted to receive eggs after traveling through said upper section for movement thereof onto said second conveying means, said intermediate angular transition conveyor being angled downwardly from said upper section toward said intermediate section to facilitate downward movement of eggs from said first conveying means to said second conveying means;

E. a lower egg washing means positioned within said lower section for cleaning of eggs being conveyed therethrough;

F. a third conveying means adapted to receive eggs from said intermediate conveying means for conveying thereof generally away from said inlet wall means toward said outlet wall means through said lower section to allow washing thereof by said lower egg washing means, said third conveying means being oriented to move in a direction opposite relative to said second conveying means thereabove to facilitate washing of eggs traveling thereon, said third conveying means including a lower angular transition conveyor adapted to receive eggs after being conveyed through said intermediate section for urging movement thereof onto said third conveying means, said third angular transition conveyor being angled downwardly from said intermediate section toward said lower section to facilitate downward movement of eggs from said intermediate conveying means to said third conveying means;

G. a pre-washing means positioned within said upper section of said washing chamber means for prewashing of eggs traveling therethrough upon said first conveying means, said pre-washing means including a plurality of pre-washing nozzles positioned above said first conveying means for wetting of eggs being conveyed thereon through said upper section to facilitate washing thereof; and H. an accumulator means positioned between said first conveying means and said second conveying means, said accumulator means adapted to receive eggs from said first conveying means for dividing thereof into rows of separately positioned eggs for conveying thereof to facilitate egg washing, said accumulator means adapted to deliver eggs onto said second conveying means for washing thereof, said accumulator means including an accumulator conveying means adapted to receive eggs from said first conveying means for unstacking thereof and organizing thereof within said accumulator means wherein said accumulator conveying means is operated at a speed of surface movement faster than the speed of surface movement of said first conveying means to facilitate organizing of eggs arranged separately in rows by said accumulator means.

* * * * *